(12) United States Patent
Fujioka et al.

(10) Patent No.: US 8,255,173 B2
(45) Date of Patent: Aug. 28, 2012

(54) LOAD MEASURING APPARATUS, METHOD, AND PROGRAM

(75) Inventors: Hideyasu Fujioka, Nagasaki (JP); Yoshiyuki Hayashi, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 12/601,313

(22) PCT Filed: Apr. 24, 2009

(86) PCT No.: PCT/JP2009/058139
§ 371 (c)(1),
(2), (4) Date: Nov. 23, 2009

(87) PCT Pub. No.: WO2010/122658
PCT Pub. Date: Oct. 28, 2010

(65) Prior Publication Data
US 2012/0035865 A1 Feb. 9, 2012

(51) Int. Cl.
*G06F 19/00* (2006.01)
*F03D 7/04* (2006.01)
*H02P 9/04* (2006.01)
(52) U.S. Cl. .............................. 702/42; 290/44; 290/55
(58) Field of Classification Search .................... 702/42, 702/145; 290/44, 54, 55
See application file for complete search history.

(56) References Cited

U.S. PATENT DOCUMENTS

| 5,155,375 A * | 10/1992 | Holley ............................ 290/44 |
| 6,940,186 B2 | 9/2005 | Weitkamp |
| 2004/0108732 A1 | 6/2004 | Weitkamp |

FOREIGN PATENT DOCUMENTS

| JP | 2004036612 A | 2/2004 |
| JP | 2008286156 A | 11/2008 |

* cited by examiner

*Primary Examiner* — Bryan Bui
(74) *Attorney, Agent, or Firm* — Kanesaka Berner & Partners, LLP

(57) ABSTRACT

A load is based calibrate on data collected under wide observation conditions and promptly calibrate loads of a plurality of wind turbine blades. A load measuring apparatus is applied to a wind turbine in which a pitch angle of a wind turbine blade is variable. The apparatus includes a sensor for obtaining a distortion of the wind turbine blade; a load calculating unit having a function expressing a relation between the distortion of the wind turbine blade and a load on the wind turbine blade, for obtaining the load on the wind turbine blade by applying to the function the distortion based on measurement data of the sensor; and a calibration unit for calibrating the function based on the measurement data of the sensor obtained in a pitch angle range and a rotational speed range of the wind turbine blade in which a variation between maximum and minimum aerodynamic torques is equal to or less than a predetermined value.

8 Claims, 9 Drawing Sheets

1; WIND TURBINE GENERATOR
3; NACELLE
4; ROTOR HEAD
7; SENSOR
10; WIND TURBINE BLADE

UNIT : [kNm]

| PITCH ANGLE [DEGREES] | AZIMUTH ANGLE [DEGREES] | | | | | | |
|---|---|---|---|---|---|---|---|
| | 0 | | | | | | 360 |
| 14 | $\alpha_1$ | $\alpha_2$ | $\alpha_3$ | $\alpha_4$ | | | |
| ⋮ | ⋮ | ⋮ | ⋮ | ⋮ | | ⋮ | ⋮ |
| 109 | | | | | | | |

AZIMUTH ANGLE : Ψ

LOAD MEASURING APPARATUS, METHOD, AND PROGRAM

CROSS-REFERENCE TO RELATED APPLICATIONS

The present application is based on International Application No. PCT/JP2009/058139, filed Apr. 24, 2009, and priority is hereby claimed under 35 USC §119 based on this application. This application is hereby incorporated by reference in its entirety into the present application.

TECHNICAL FIELD

The present invention relates to a load measuring apparatus, method, and program.

BACKGROUND ART

Generally, in a wind turbine generator, sensors each for measuring a load applied to a wind turbine blade are attached to a blade root part and the like, and a load is calculated by processing data measured by those sensors. However, since the relation between a load applied to each of the wind turbine blades and a distortion is not constant due to individual differences which occur at the time of manufacture of blades and at the time of attachment of the sensors, there is proposed a method of measuring a load for each wind turbine blade and calibrating a load value.
Patent Citation 1: U.S. Pat. No. 6,940,186

DISCLOSURE OF INVENTION

Conventionally, a load on each wind turbine blade is measured in a state where a wind turbine rotor is manually fixed so as not to rotate (using a lock pin or the like) and calibration of the load is performed.

However, the calibration work has to be performed for each wind turbine. To perform calibration on all of wind turbines, the rotors have to be fixed manually. In a case of a large-scaled wind firm in which hundreds of wind turbine generators are installed, enormous work time is necessary. In addition, since the relation between a load applied to a wind turbine blade and a distortion varies among wind turbines and wind turbine blades, the calibration work has to be repeatedly performed on the wind turbine blades. It takes long time to move a blade to a predetermined position (angle) by using a turning motor and fix it, and thus the work is not performed smoothly. There is consequently a problem such that the work efficiency is low.

The present invention has been achieved to solve the above problem, and an object thereof is to provide a load measuring apparatus, method, and program capable of efficiently calibrating a load on a wind turbine blade regardless of observation conditions.

A first mode of the present invention relates to a load measuring apparatus applicable to a wind turbine in which a pitch angle of a wind turbine blade is variable, the apparatus including: a sensor for obtaining a distortion of the wind turbine blade; a load calculating means having a function expressing a relation between the distortion of the wind turbine blade and a load on the wind turbine blade, for obtaining the load on the wind turbine blade by applying to the function the distortion based on measurement data of the sensor; and a calibrating means for calibrating the function based on the measurement data of the sensor obtained in a pitch angle range and a rotational speed range of the wind turbine blade in which a variation between maximum and minimum aerodynamic torques due to wind speeds is equal to or less than a predetermined value.

With such a configuration, the calibrating means for calibrating the function held in the load calculating means is provided. The calibrating means calibrates the function based on the measurement data of the sensor obtained in the pitch angle range and the rotational speed range of the wind turbine blade in which the variation between the maximum and minimum aerodynamic torques due to wind speeds is equal to or less than a predetermined value. Therefore, the conditions of the wind speed can be widened.

In the load measuring apparatus, the calibrating means may calibrate the function based on the measurement data of the sensor obtained in the pitch angle range and the rotational speed range of the wind turbine blade in which the aerodynamic torque is equal to or less than a predetermined value.

With the configuration, the measurement data of the sensor obtained in the pitch angle range of the wind turbine blade in which the aerodynamic torque is equal to or less than a predetermined value is used, so that the influence of the aerodynamic torque can be ignored.

In the load measuring apparatus, the calibrating means may include: a table in which the load on the wind turbine blade in a calm state and a pitch angle and an azimuth angle of the wind turbine blade are associated with one another; a load obtaining means for obtaining from the table a load on the wind turbine blade corresponding to the pitch angle and the azimuth angle of the wind turbine blade when the measurement data is obtained by the sensor; a distortion calculating means for calculating a distortion of the wind turbine blade from the measurement data of the sensor; and a parameter calculating means for calibrating a parameter of the function based on the relation between the load on the wind turbine blade obtained by the load obtaining means and the distortion calculated by the distortion calculating means.

As described above, in the table in the calibrating means, the load on the wind turbine blade in the calm state, the pitch angle, and the azimuth angle of the wind turbine blade are associated with one another. The load on the wind turbine blade corresponding to the pitch angle and the azimuth angle of the wind turbine blade when the measurement data is obtained by the sensor is obtained from the table by the load obtaining means. The distortion of the wind turbine blade is calculated from the measurement data of the sensor by the distortion calculating means. The parameter of the function is calibrated by the parameter calculating means based on the relation between the load on the wind turbine blade obtained by the load obtaining means and the distortion calculated by the distortion calculating means.

Since the load is associated with the azimuth angle and the pitch angle in the table in the calibrating means, when the azimuth angle and the pitch angle upon the measurement data being obtained are known, the load on the wind turbine blade at that time can be easily grasped. Since the parameter of the function is calibrated based on the relation between the distortion of the wind turbine blade calculated based on the measurement data and the load determined based on the measurement data, the distortion of the measurement data can be calibrated with high precision.

In the load measuring apparatus, the calibrating means may obtain the measurement data of the sensor in the calm state based on the load on the wind turbine blade obtained by the load obtaining means and the measurement data of the sensor, and offset-calibrates the measurement data of the sensor by using the measurement data in the calm state.

With the configuration, the measurement data in the calm state included in the measurement data of the sensor is obtained and the offset calibration is performed thereon, so that precision of the measurement data can be improved.

In the load measuring apparatus, the sensor may include: a pair of first sensors provided in positions opposed to each other with the wind turbine blade sandwiched therebetween; and a pair of second sensors provided in positions opposed to each other with the wind turbine blade sandwiched therebetween, the positions different from those of the first sensors.

With the configuration, the loads in different directions in one wind turbine blade can be measured. For example, when the first sensors are provided on the inside and backside of a wind turbine blade, and the second sensors are provided at the edge side of the wind turbine blade, the load applied in the direction on the feather side of the wind turbine blade and the load applied in the direction on the fine side thereof can be measured by these sensors.

In the load measuring apparatus, the sensor may include: a pair of third sensors provided in positions opposed to each other with the wind turbine blade sandwiched therebetween, the positions different from those of the first and second sensors and parallel to either of the first and second sensors.

With the configuration, by the third sensors, the apparatus can be used for measuring information other than a load.

A second mode of the present invention relates to a load measuring apparatus applicable to a wind turbine in which a pitch angle of a wind turbine blade is variable, the apparatus including: a sensor for obtaining a distortion of the wind turbine blade; a load calculating means having a function expressing a relation between the distortion of the wind turbine blade and a load on the wind turbine blade, for obtaining the load on the wind turbine blade by applying to the function the distortion based on measurement data of the sensor; and a calibrating means for calibrating the function based on respective measurement data of the sensor obtained when the pitch angle is set to minimum and maximum pitch angles in two points of a first azimuth angle and a second azimuth angle different from the first azimuth angle by 180 degrees in a case where a wind speed is equal to or less than three meters per second.

With such a configuration, the calibrating means for calibrating the function of the load calculating means is provided. The calibrating means can calibrate the function based on the measurement data of each of the sensors obtained when the pitch angle is set to the minimum and maximum pitch angles in the two points of the first azimuth angle and the second azimuth angle different from the first azimuth angle by 180 degrees in the case where the wind speed is equal to or less than three meters per second. Therefore, the function can be calibrated on the basis of a small amount of measurement data.

A third mode of the present invention relates to a load measuring method applicable to a wind turbine in which a pitch angle of a wind turbine blade is variable, the method including: obtaining a distortion of the wind turbine blade; providing a function expressing a relation between the distortion of the wind turbine blade and a load on the wind turbine blade, and obtaining the load on the wind turbine blade by applying to the function the distortion based on measurement data of the sensor; and calibrating the function based on the measurement data of the sensor obtained in a pitch angle range and a rotational speed range of the wind turbine blade in which a variation between maximum and minimum aerodynamic torques due to wind speeds is equal to or less than a predetermined value.

A fourth mode of the present invention relates to a load measuring program applicable to a wind turbine in which a pitch angle of a wind turbine blade is variable, and making a computer execute: a first process of providing a function expressing a relation between a distortion of the wind turbine blade and a load on the wind turbine blade, and obtaining the load on the wind turbine blade by applying to the function a distortion based on measurement data of the sensor; and a second process of calibrating the function based on the measurement data of the sensor obtained in a pitch angle range and a rotational speed range of the wind turbine blade in which a variation between maximum and minimum aerodynamic torques due to wind speeds is equal to or less than a predetermined value.

A fifth mode of the present invention relates to a load measuring method applicable to a wind turbine in which a pitch angle of a wind turbine blade is variable, the method including: providing a function expressing a relation between a distortion of the wind turbine blade and a load on the wind turbine blade, and obtaining the load on the wind turbine blade by applying to the function a distortion based on measurement data of the sensor; and calibrating the function based on respective measurement data of the sensor obtained when the pitch angle is set to minimum and maximum pitch angles in two points of a first azimuth angle and a second azimuth angle different from the first azimuth angle by 180 degrees in a case where a wind speed is equal to or less than three meters per second.

A sixth mode of the present invention relates to a load measuring program applicable to a wind turbine in which a pitch angle of a wind turbine blade is variable, and making a computer execute: a first process of providing a function expressing a relation between a distortion of the wind turbine blade and a load on the wind turbine blade, and obtaining the load on the wind turbine blade by applying to the function a distortion based on measurement data of the sensor; and a second process of calibrating the function based on respective measurement data of the sensor obtained when the pitch angle is set to minimum and maximum pitch angles in two points of a first azimuth angle and a second azimuth angle different from the first azimuth angle by 180 degrees in a case where a wind speed is equal to or less than three meters per second.

According to the present invention, there is an effect that a load on a wind turbine blade can be efficiently calibrated regardless of observation conditions.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

EXPLANATION OF REFERENCE

Figure 1:
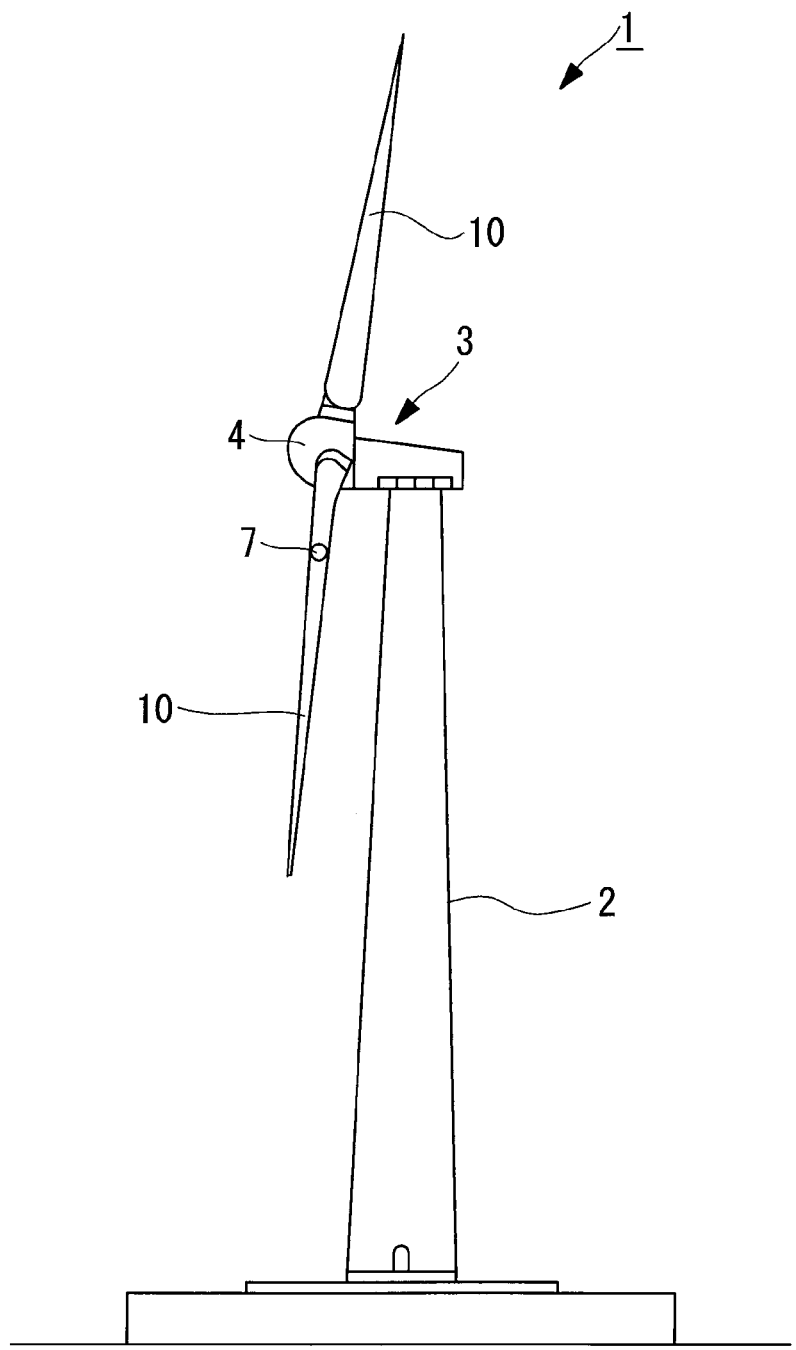
FIG. 1 Diagram showing a schematic configuration of an entire wind turbine generator according to a first embodiment of the present invention.

1: wind turbine generator
7: sensor
20: load calculating unit
30: calibration unit
31: table
32: load obtaining unit
33: distortion calculating unit
34: parameter calculating unit
100: load measuring apparatus

BEST MODE FOR CARRYING OUT THE INVENTION

An embodiment of a load measuring apparatus, method, and program according to the present invention will be described below with reference to the drawings.

First Embodiment

FIG. 1 is a diagram showing a schematic configuration of a wind turbine generator to which a load measuring apparatus 100 according to the present embodiment is applied. A wind turbine generator 1 according to the present embodiment is a wind turbine in which a pitch angle of a wind turbine blade 10 is variable.

The wind turbine generator 1 includes, as shown in FIG. 1, a support 2, a nacelle 3 mounted on the upper end of the support 2, and a rotor head (hub) 4 provided to the nacelle 3 so as to be rotatable about an almost horizontal axis. To the rotor head 4, three wind turbine blades 10 are radially attached about the rotational axis of the rotor head 4. With the configuration, the force of wind hitting the wind turbine blade 10 from the rotational axis direction of the rotor head 4 is converted to power for rotating the rotor head 4 about the rotational axis, and this power is converted to electric energy by a generator.

Each of the wind turbine blades 10 is provided with a plurality of sensors (sensing units) 7 for obtaining a distortion of the wind turbine blade 10. The sensor 7 is, for example, an FBG sensor (Fiber Bragg Grating sensor). The FBG is an optical fiber sensor in which Bragg grating is formed and detects a change in grating spacing caused by distortion and thermal expansion based on a change in wavelength of reflected light.

The rotor head 4 also has a signal processor (not shown) for receiving a measurement result in the sensor 7 (sensing unit).

Concretely, each wind turbine blade 10 is provided with first, second, and third sensors. Each of the first, second, and third sensors has a pair of sensors provided in opposite positions sandwiching the wind turbine blade 10. Preferably, the first and second sensors are provided so that a straight line connecting the two sensors constructing the first sensor and a straight line connecting the two sensors constructing the second sensor cross almost perpendicular to each other. The third sensor is, for example, a sensor used for temperature compensation and is provided in the periphery of the first or second sensor.

Figure 2:
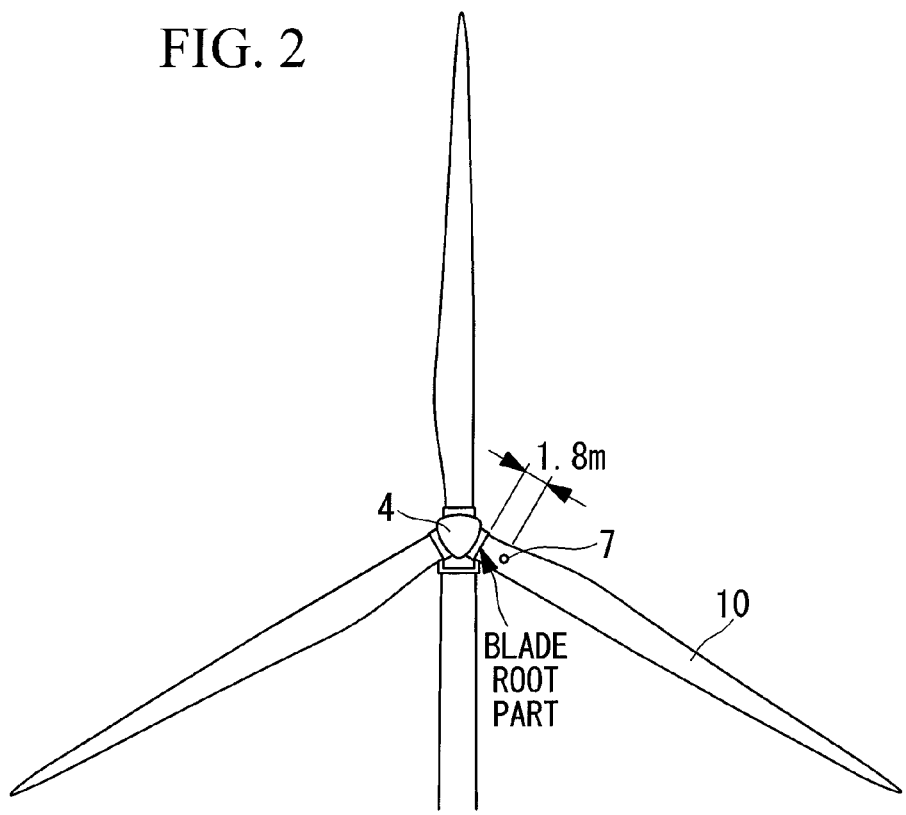
FIG. 2 Diagram for explaining a blade root part.

FIG. 2 is a diagram for explaining the position of the sensor 7 (sensing unit) attached to the wind turbine blade. As shown in FIG. 2, in the present embodiment, the sensor 7 is provided, for example, in a position away from the root of the wind turbine blade 10 by 1.8 meters. The root corresponds to the border between the wind turbine blade 10 and the rotor head 4 as shown in FIG. 2. In the present embodiment, the root will be called the "blade root part".

Figure 3:
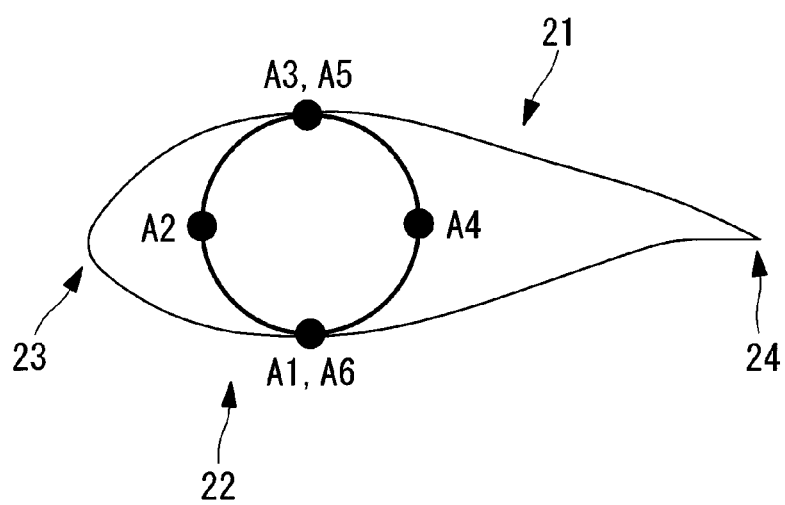
FIG. 3 An example of a cross section in a position of 1.8 meters from the root part of a wind turbine blade.

FIG. 3 is a cross section in the position away by 1.8 meters from the blade root part of the wind turbine blade 10 to which the sensor 7 is attached. In FIG. 3, a sensor A3 is provided on a back side 21 of the wind turbine blade 10, and a sensor A1 is provided on a ventral side 22, thereby constructing the first sensor. A sensor A5 is provided in the same position as A3, and a sensor A6 is provided in the same position as A1, thereby constructing the third sensor. A sensor A2 is provided in the direction of a front edge 23 of the wind turbine blade 10, and a sensor A4 is provided in the direction of a rear edge 24, thereby constructing the second sensor.

Figure 4:
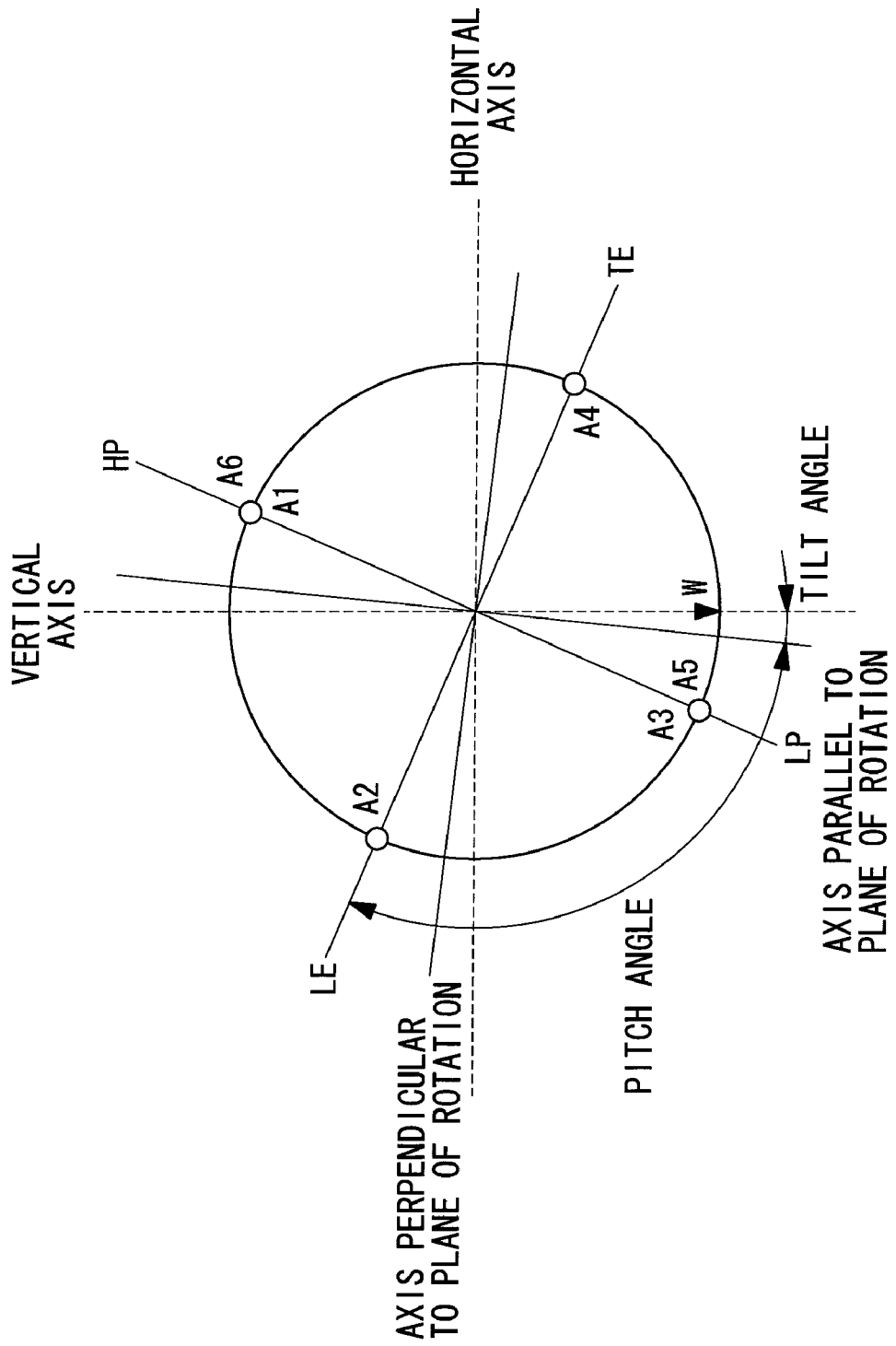
FIG. 4 Diagram for explaining arrangement of a sensor position seen from the blade root part.

FIG. 4 is a diagram schematically showing arrangement of the sensors 7 attached to the wind turbine blade 10 viewed from the blade root part of the wind turbine blade 10. As shown in FIG. 4, in the present embodiment, the position where the sensor A1 is provided is defined as HP, the position where the sensor A3 is provided is defined as LP, the position where the sensor A2 is provided is defined as LE, and the position where the sensor A4 is provided is defined as TE. In FIG. 4, a tilt angle indicates tilt of a plane of rotation of the wind turbine blade 10 with respect to the vertical axis of a tower. Such a tilt angle is provided to prevent the wind turbine blade 10 and the tower from being in contact with each other even when the wind turbine blade 10 is deformed by a wind force at the time of operation. The tilt angle may be ignored in calculation which will be described later, or may be taken into consideration.

Next, the configuration of the load measuring apparatus 100 according to the present embodiment will be described in detail.

Figure 5:
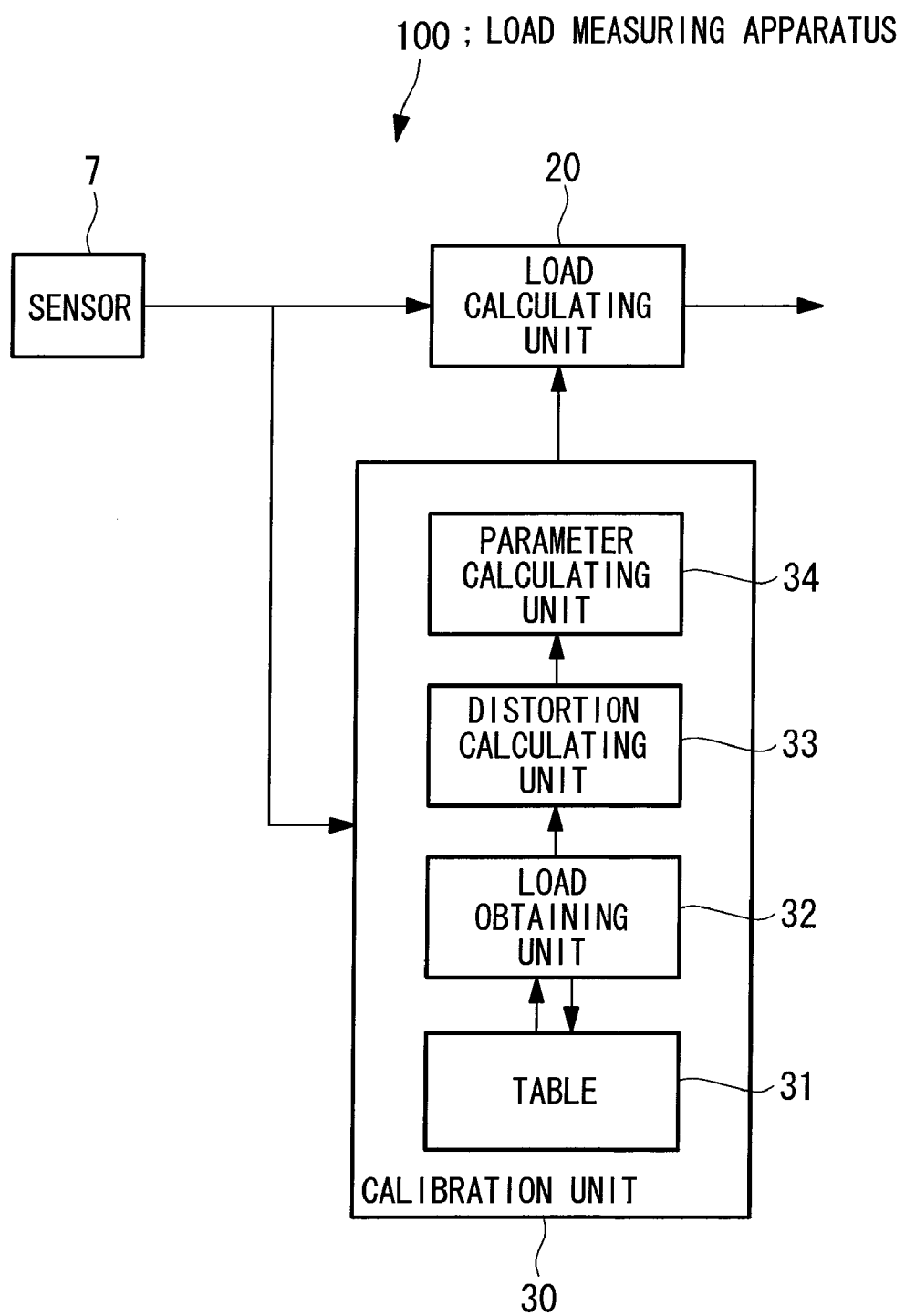
FIG. 5 Block diagram showing a schematic configuration of a load measuring apparatus according to the first embodiment of the present invention.

FIG. 5 is a functional block diagram showing functions of the load measuring apparatus 100 which are illustrated in an expanded manner.

As shown in FIG. 5, the load measuring apparatus 100 according to the present embodiment has a load calculating unit (load calculating means) 20 and a calibration unit (calibration means) 30.

The load calculating unit 20 has a function expressing the relation between a distortion of the wind turbine blade and a load on the wind turbine blade 10 and, by using the distortion based on measurement data of the sensors A1 to A6 to the function, obtains the load on the wind turbine blade 10.

The calibration unit 30 calibrates the function on the basis of the measurement data of the sensors obtained in the pitch angle range and the rotational speed range of the wind turbine blade 10 in which a variation between the maximum and minimum aerodynamic torques by wind speed becomes a predetermined value or less. It is more preferable to use measurement data of the sensors obtained in a period satisfying conditions of the pitch angle range and conditions of the rotational speed range of the wind turbine blade 10 in which the aerodynamic torque becomes a predetermined value or less.

The measurement data of the sensors used for calibration of the function by the calibration unit 30 will be described concretely.

Figure 6:
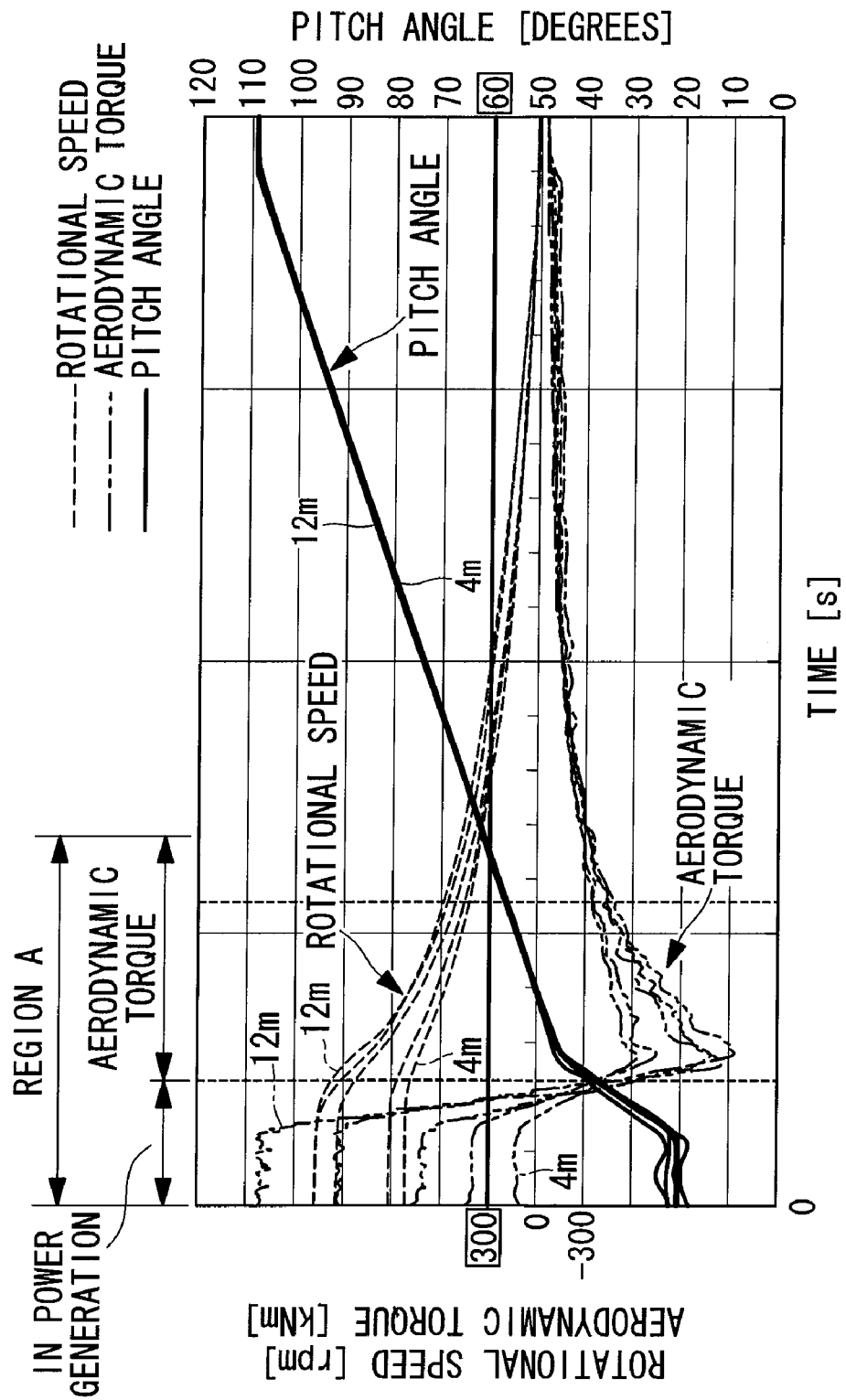
FIG. 6 Diagram showing the relations among aerodynamic torque, generator rotational speed, and pitch angle at respective wind speeds.

FIG. 6 is a diagram showing changes in aerodynamic torque by wind speeds (from 4 meters per second to 12 meters per second of wind speed) while the wind turbine blade 10 is changed from a fine side (pitch angle of 21 degrees) to a feather side (pitch angle of 109 degrees) until the wind turbine blade 10 is stopped. The pitch angles of 21 degrees and 109 degrees indicate angles of the wind turbine blade 10 in a case where the position of a blade reference line determined upon attachment of the wind turbine blade 10 to the wind turbine rotor 3 is defined as 0 angle. The pitch angle of 0 degree is an angle on the blade reference line defined in a blade cross section, and an angle formed by this line and the rotor plane is a pitch angle.

To obtain FIG. 6, the three wind turbine blades 10 are simultaneously changed at a velocity of 2.5 degrees per second in the range where the pitch angle is 21 degrees to 45 degrees, and at a velocity of 1.0 degree per second in the range where the pitch angle is 45 degrees to 109 degrees, and measurement data of the three wind turbine blades 10 is obtained. The wind turbine blades 10 are rotated by changing the pitch angle and are in an idle state. The idle state is a state where the wind turbine blades 10 are rotated in a range of the wind turbine generator 1 not generating power (for example, a state where the wind turbine blades 10 rotate at a low speed).

Since similar processes are performed on all of the three wind turbine blades 10, in the following, description will be made on one wind turbine blade 10.

As shown in FIG. 6, a region A includes a period in which the wind turbine generator generates power and a period in which an aerodynamic brake as a force for stopping rotation of a rotor is strongly applied by opening the pitch angle to a feather side for stop or the like. As shown in FIG. 6, in the region A, there is applied an aerodynamic torque which varies according to wind speed. After that, on the right side of the region A (in other words, in the case where the pitch angle is larger than 60 degrees and the rotational speed of the generator is 0 to 300 rpm (at a frequency of 60 Hz)), the value of torque is approximately −300 kilo-newton-meters or more at any wind speed, which is such a small torque that the influence of the aerodynamic torque can be ignored.

In FIG. 6, the condition of the rotational speed range on the right side of the region A is 0 to 300 rpm. However, the present invention is not limited to this condition. The condition may be set according to frequency. For example, in a case of 50 Hz, the condition of the rotational speed range may be set to 0 to 250 rpm.

As described above, the calibration unit 30 uses measurement data obtained in the region other than the region A, that is, in the range where the aerodynamic torque does not depend on wind speed. In other words, used is measurement data obtained in the range of 60 degrees to 109 degrees of the pitch angle, as the pitch angle in the range where the variation between the maximum and minimum aerodynamic torques is equal to or less than a predetermined value. The reason for using data in the region other than the region A will be described later.

More concretely, the calibration unit 30 has a table 31, a load obtaining unit (load obtaining means) 32, a distortion calculating unit (distortion calculating means) 33, and a parameter calculating unit 34.

The calibration unit 30 obtains measurement data of the sensor 7 in a no-load state on the basis of the load on the wind turbine blade 10 obtained by the load obtaining unit 32 and measurement data of the sensor 7, and performs offset calibration on the measurement data of the sensor 7 by using the measurement data in the no-load state. By this operation, in consideration of a measurement error included in the sensor 7 itself, precision of the calibration can be improved.

In the table 31, the load on the blade root part of the wind turbine blade 10, the pitch angle of the wind turbine blade 10, and the azimuth angle thereof in a calm state (an ideal environment condition for calibration) are associated with one another. For example, the table 31 is provided as a list (table) shown in FIG. 7, in which stored are values $\alpha_1$, $\alpha_2$, $\alpha_3$, $\alpha_4$, ... of the load on the blade root part associated with the combination of the azimuth value and the pitch angle of the wind turbine blade 10.

Figures 7, 8:
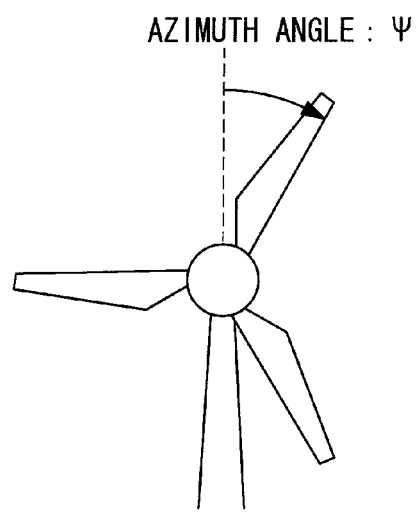
FIG. 7 Diagram showing an example of a table of a calibration unit.
FIG. 8 Diagram for explaining an azimuth angle.

The azimuth angle is, as shown in FIG. 8, an angle formed by a predetermined reference and the axis of the wind turbine blade 10 in the plane of rotation of the wind turbine blade 10, and in the present embodiment, the reference is set in a state where the wind turbine blade 10 is positioned at the highest position. Therefore, the azimuth angle with the wind turbine blade 10 being positioned at the highest part of the wind turbine is zero degree, and the azimuth angle with the wind turbine blade 10 being positioned at the lowest part is 180 degrees.

In the list (table) as shown in FIG. 7, a moment in the blade root part can be obtained by calculating each of moments by deadweights in the positions of the sensors A1 to A4 according to the following equation (1) and coordinate-converting these moments.

$$M = 9.8 \times W \times l_g \times \sin\theta \cdot \cos\beta \; [\text{Nm}] \quad (1)$$

In the equation (1), W denotes the weight of the wind turbine blade 10, $l_g$ denotes the position of the center of gravity measured from the blade root part of the wind turbine blade 10 (which is a known value at the stage of manufacture), θ indicates a function between the azimuth angle and the tilt angle, and β expresses a function between the pitch angle and the tilt angle.

The load obtaining unit 32 obtains from the table 31 the load on the blade root part of the wind turbine blade 10 corresponding to the pitch angle and the azimuth angle of the wind turbine blade 10 when measurement data is obtained by the sensor 7.

The distortion calculating unit 33 calculates distortion of the wind turbine blade 10 from the measurement data of the sensor 7. Concretely, the distortion calculating unit 33 extracts a distortion wavelength from the measurement data of the sensor 7, and converts the distortion wavelength to a distortion on the basis of a predetermined function. More concretely, the distortion wavelength data in the measurement data of the sensor 7 is converted to a numerical value by a not-shown signal processor provided at the rotor head 4. The distortion wavelength obtained as the numerical value is converted to a distortion $\epsilon$. The distortion $\epsilon$ is obtained by the following equation (2).

$$\epsilon = P_e\{(\lambda - \lambda_i) - \alpha(\lambda_T - \lambda_{Ti})\} \quad (2)$$

In the equation (2), $\lambda$ denotes measurement data obtained by the first sensor (second sensor), $\lambda_i$ denotes measurement data in the no-load state obtained by the first sensor (second sensor), $\lambda_T$ denotes measurement data obtained by the third sensor, $\lambda_{Ti}$ denotes calculation data in the no-load state obtained by the third sensor, $p_e$ indicates a distortion optical constant (809 με/nm), and α indicates a temperature compensation coefficient (2.2). $\lambda_i$ is an average value of measurement data and is obtained by the following equation.

$$\lambda_i = (\lambda_{max} + \lambda_{min})/2 \quad (3)$$

In the equation (3), $\lambda_{max}$ denotes the maximum peak value of data, and $\lambda_{min}$ denotes the minimum peak value.

Since a distortion is calculated in each of the sensors A1 and A3 constructing the first sensor as well as each of the sensors A2 and A4 constructing the second sensor as described above, four distortions are calculated. Further, by calculating the difference between the distortions obtained by the sensors A1 and A3 constructing the first sensor, a distortion $\epsilon_F$ in the flap direction (the HP-LP direction in FIG. 4) of the wind turbine blade 10 is calculated. By calculating the difference between the distortions obtained by the sensors A2 and A4 constructing the second sensor, a distortion $\epsilon_E$ in the edge direction (the LE-TE direction in FIG. 4) of the wind turbine blade 10 is calculated.

The parameter calculating unit 34 calibrates a parameter of a function on the basis of the relation between the load on the wind turbine blade 10 obtained by the load obtaining unit 32 and the distortion calculated by the distortion calculating unit 33. Concretely, a new function is constructed on the basis of the relation among distortions $\epsilon_F$ and $\epsilon_E$ and a load on the blade root part of the wind turbine blade 10 associated with the azimuth angle and the pitch angle at a timing of obtaining measurement data as original data based on which distortions $\epsilon_F$ and $\epsilon_E$ are calculated. By using a coefficient of the new function, the coefficient of the function in the load calculating unit 20 is calibrated. One new function is generated in the flap direction, and another one new function is generated in the edge direction.

For example, to convert the distortion $\epsilon$ to a moment in the position of the sensor, the following equation (4) is used. "d" denotes the inner diameter of the wind turbine blade 10 in the mount position (1.8 meters away from the blade root part) of the sensor 7, L denotes number of the wind turbine blade 10 (L=1, 2, 3), E denotes Young's modulus of the blade material (FRP), I denotes a second moment of area in the mount position of the sensor, $M_{sensor}$ denotes a bending moment (load) in the sensor mount position, $\epsilon_{2L-1}$ and $\epsilon_{2L}$ denote distortions based on the measurement data of the pair of sensors (the first or second sensor), and $\epsilon_{2L-1,0}$ and $\epsilon_{2L,0}$ are initial values of distortions of the first or second sensor.

[Mathematical Expression 1]

$$M_{sensor} = \frac{EI}{d}\{(\varepsilon_{2L-1} - \varepsilon_{2L}) - (\varepsilon_{2L-1,0} - \varepsilon_{2L,0})\} \times 10^{-6} \quad (4)$$

Regarding this moment, when the ratio between a moment $M_{root}$ in the blade root part of the wind turbine blade 10 and the moment $M_{sensor}$ in the mount position of the sensor 7 (for example, the position away from the blade root part of the wind turbine blade 10 by 1.8 m) is set as β (>1), the following equation is obtained.

[Mathemetical Expression 2]

$$M_{root} = \beta M_{sensor} \quad (5)$$
$$= \frac{\beta EI}{d}\{(\varepsilon_{2L-1} - \varepsilon_{2L}) - (\varepsilon_{2L-1,0} - \varepsilon_{2L,0})\} \times 10^{-6}$$
$$= a(\varepsilon_{2L-1} - \varepsilon_{2L}) \times 10^{-6} + b [Nm]$$

where $$a = \frac{\beta EI}{d} [Nm] \quad (6)$$

$$b = -\frac{\beta EI}{d}(\varepsilon_{2L-1,0} - \varepsilon_{2L,0}) \times 10^{-6} [Nm] \quad (7)$$

As shown in the equation (5), the moment $M_{root}$ in the blade root part is expressed as a linear function using coefficients "a" and "b" as parameters and using distortions of the pair of sensors (the first or second sensor) as variations.

Consequently, in a case of generating a graph of the moment $M_{root}$ with a distortion $\epsilon_F$ or $\epsilon_E$ on the horizontal axis and the azimuth angle and pitch angle on the vertical axis, by calculating a gradient "a" and an intercept "b" obtained on the basis of the linear function, the coefficients "a" and "b" can be calculated as parameters.

A method of forming a graph of the linear function will be described in the following.

Figure 9:
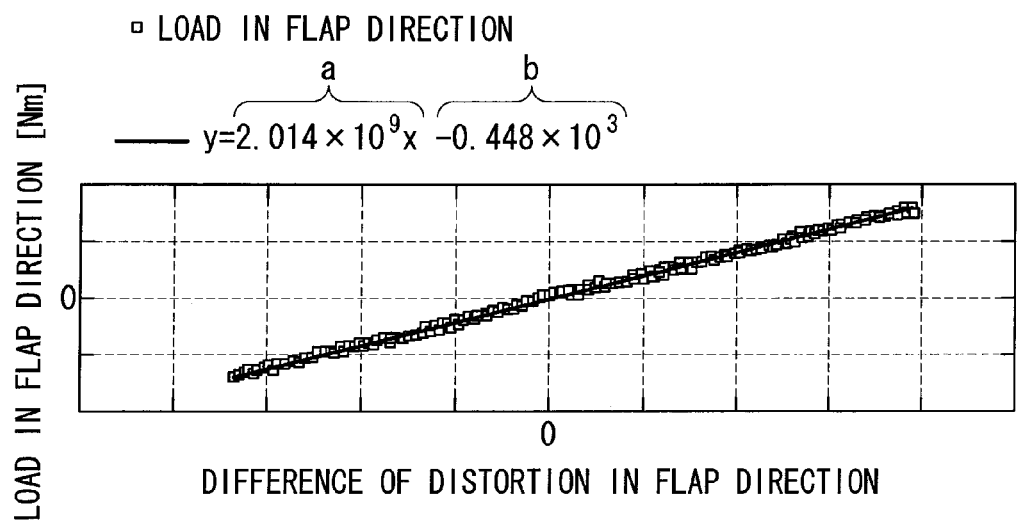
FIG. 9 Diagram of an example showing the relation between distortion and load on the basis of measurement data.

A graph is formed by setting the distortion $\epsilon_F$ in the flap direction and the distortion $\epsilon_E$ in the edge direction in each of the wind turbine blades 10 on the horizontal axis and setting the load (moment) $M_{root}$ corresponding to the distortions $\epsilon_F$ and $\epsilon_E$ obtained from the table 31 on the vertical axis, and the tilt "a" and the intercept "b" are extracted from the graph. More concretely, a graph shown in FIG. 9 is generated. On the basis of such a graph, the coefficients "a" and "b" in the case of the flap direction of each of the wind turbine blades 10 and the coefficients "a" and "b" in the case of the edge direction are calculated. For example, as a parameter in the flap direction in the first wind turbine blade 10#1, there are set a=2.014×10$^9$ and b=−0.448×10$^3$. Similarly, for each of the wind turbine blades 10#2 and 10#3, the coefficients "a" and "b" in the flap direction and in the edge direction are calculated.

The parameter calculating unit 34 calculates the coefficients "a" and "b" as described above and then outputs them to the load calculating unit 20. With the above, the parameters of the function of the load calculating unit 20 are calibrated. By applying measurement data obtained from the sensor to the function of the load calculating unit 20, the obtained moment in the blade root part is calibrated.

Next, the actions of the calibration unit 30 of the load measuring apparatus according to the present embodiment will be described. Since processes performed on each of the wind turbine blades 10 are the same, in the following description, the processes on one wind turbine blade 10 will be described as an example.

First, in the present embodiment, the pitch angle is changed from 60 degrees to 109 degrees, and measurement data of the sensors A1 to A6 is obtained. The measurement data is provided to the load obtaining unit 32 of the calibration unit 30.

Figure 10:
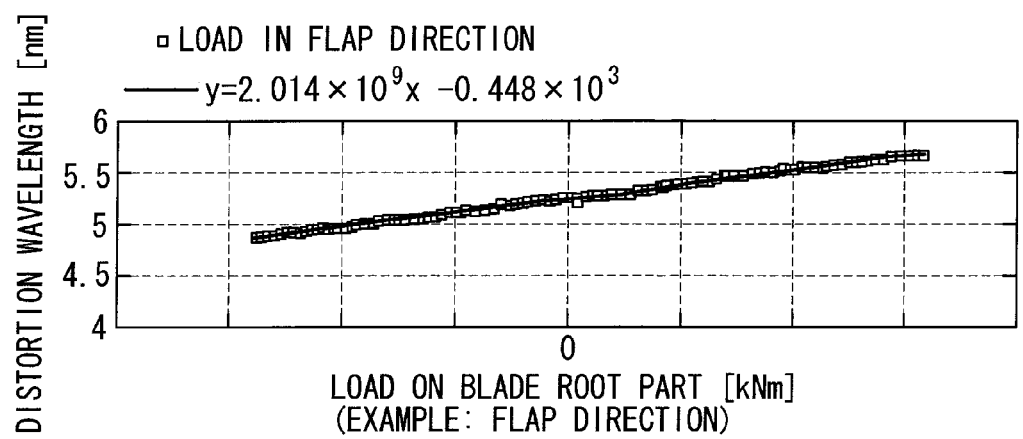
FIG. 10 Diagram of an example showing the relation between load and distortion wavelength in the blade root part.

The load obtaining unit 32 refers to the table 31 and reads the load on the blade root part associated with the information on the azimuth angle and the pitch angle of the measurement data obtained by the sensors A1 to A6. Subsequently, the load obtaining unit 32 generates a graph showing the measurement data of each of the sensors on the vertical axis and the load on the blade root part on the horizontal axis for each of the sensors (see FIG. 10) and, from the graphs, reads the distortion wavelength when the value of the load on the horizontal axis is "0". This value corresponds to measurement data of the sensor in the no-load state, that is, the offset value of each sensor. The charge obtaining unit 32 outputs to the distortion calculating unit 33, together with the offset values of the sensors, information on the load on the blade root part read from the table 31 and data of the sensors when the load is obtained. By obtaining the offset values of the sensors by the charge obtaining unit 32 as described above, in the following processes, a measurement error included in the sensor itself is calibrated, and thus measurement precision of the load can be improved.

The distortion calculating unit 33 extracts the distortion wavelengths from the measurement data of the sensors A1 to A6 and, on the basis of the measurement data calculated by the sensors and the measurement data in the no-load state, calculates the distortion (deadweight moment) $\epsilon$ in each sensor position by using the equation (2). For example, a distortion $\epsilon_{A1}$ in the sensor A1 is obtained by the following equation (2)'.

$$\epsilon_{A1}=P_e\{(\lambda_{HP}-\lambda_{HPi})-\alpha(\lambda_{HPT}-\lambda_{HPTi})\} \quad (2)'$$

In the equation (2)', $\lambda_{HP}$ denotes distortion wavelength data of the sensor A1, $\lambda_{HPT}$ denotes distortion wavelength data of the sensor A5 for temperature compensation mounted in the periphery of the sensor A1, $\lambda_{HPT}$ denotes the offset value (measurement data in the no-load state) of the sensor A1, and $\lambda_{HPTi}$ indicates the offset value (measurement data in the no-load state) of the sensor A5.

The distortion calculating unit 33 calculates the distortion $\epsilon$ for each of the sensors A3, A2, and A4 by similar calculating processes. As a result, total four distortions $\epsilon_{A1}$, $\epsilon_{A2}$, $\epsilon_{A3}$, and $\epsilon_{A4}$ are calculated. After calculating the distortions $\epsilon_{A1}$ to $\epsilon_{A4}$ for the sensors A1 to A4, the distortion calculating unit 33 outputs the values and information on the load on the blade root part inputted from the load obtaining unit 32 to the parameter calculating unit 34.

On the basis of the relation between the distortions $\epsilon_{A1}$ to $\epsilon_{A4}$ for the respective sensors and the information on the load on the blade root part inputted from the load obtaining unit 32, the parameter calculating unit 34 calibrates parameters of a function expressing the relation between the distortion of the wind turbine blade 10 and the load on the blade root part of the wind turbine blade 10.

Concretely, the relational expression between information on the load on the blade root part of the wind turbine blade 10 and the distortion of the wind turbine blade 10 is shown as the above equation (5). To be concrete, one relational expression is obtained for the first sensor, and another one relational expression is obtained for the second sensor. Therefore, two relational expressions are generated for one wind turbine blade 10. For example, the relational expression for the first sensor is shown as follows.

$$M_{HP-LP}=a(\epsilon_{A1}-\epsilon_{A3})\times 10^{-6}+b \text{ [Nm]} \quad (5)'$$

In the equation (5)', $\epsilon_{A1}$ denotes the distortion in the position of the sensor A1 calculated on the basis of the equation (2)', and $\epsilon_{A3}$ denotes the distortion in the position of the sensor A3 calculated on the basis of a similar calculation equation.

When the difference $\epsilon_{A1}-\epsilon_{A3}$ between the distortions in the flap direction in the equation (5)' (the HP-LP direction in FIG. 4) is set on the horizontal axis and $M_{HP-LP}$ is set on the vertical axis, a graph as shown in FIG. 9 is obtained. By expressing the relation between the distortions $\epsilon_{A1}$ to $\epsilon_{A4}$ and the information on the load on the blade root part in the form of a graph in this way, the intercept and the tilt of the graph can be derived, and the coefficient "a" (tilt) and the coefficient "b" (intercept) in the equation (5)' can be calculated. Two combinations of the coefficients "a" and "b" in each of the flap direction and the edge direction are calculated for one wind turbine blade 10.

By repeatedly performing the processes from measurement by the sensor to calculation of the coefficients, a plurality of coefficients is obtained. By using an average value of the coefficients, a calibrated relational expression is obtained. For example, by eliminating the maximum and minimum values, data in which noise suddenly occurs can be eliminated. Even when data which does not include noise is eliminated, no influence is exerted on calculation of an average value.

After obtaining the very reliable relational expression, in other words, the calibrated relational expression, the load calculating unit 32 calculates the load on the blade root part of the wind turbine blade 10 from the measurement data of the sensors by using the relational expression. In such a manner, a very reliable load can be calculated.

In the present embodiment, data in the region other than the region A in FIG. 6 is used out of measurement data measured by the sensors A1 to A6, which is to improve precision of the calibration. Concretely, upon obtaining the coefficients "a" and "b", approximation to a moment obtained in the calm state (ideal moment for performing calibration) is performed. It will be described more concretely with reference to FIGS. 11A and 11B as well as FIGS. 12A and 12B.

Figure 11A:
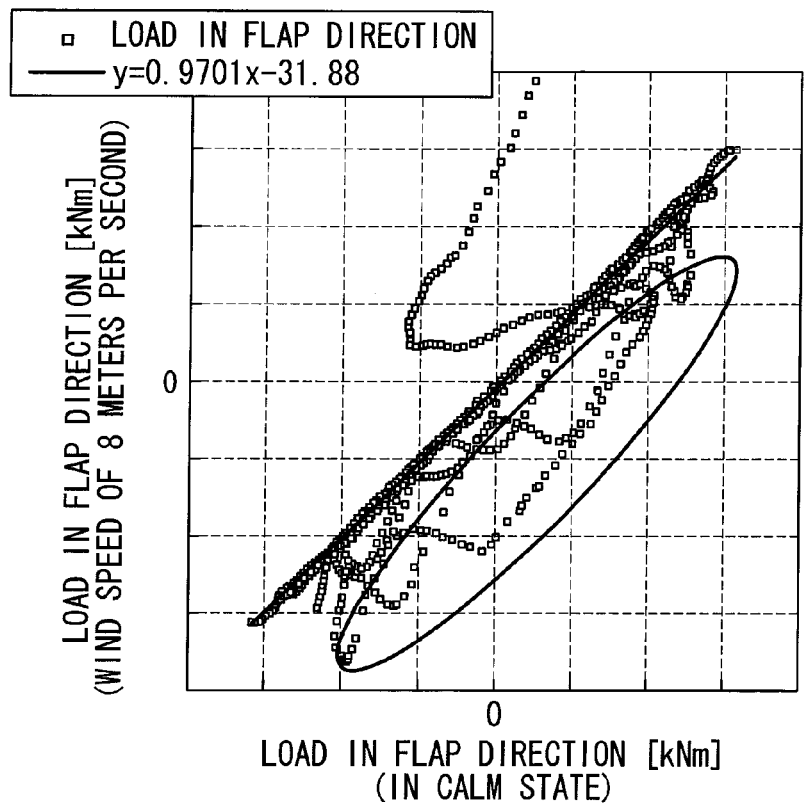
FIG. 11A Diagram showing an example of comparison between load (in the flap direction) and load in a calm state in a case where calibration is performed with including measurement data of a pitch angle in the range of a region A at a wind speed of 8 meters per second.
Figure 11B:
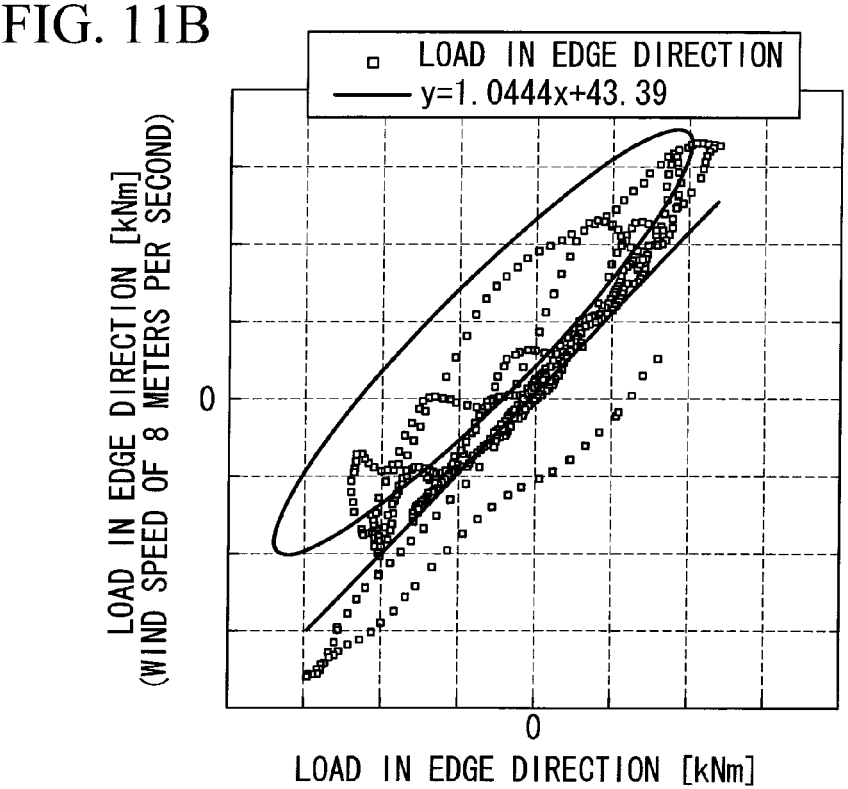
FIG. 11B Diagram showing an example of comparison between load (in the edge direction) and load in a calm state in the case where calibration is performed with including measurement data of a pitch angle in the range of the region A at a wind speed of 8 meters per second.

FIG. 11A shows moments in the flap direction in the calm state on the horizontal axis, and moments in the flap direction in a case of a wind speed of eight meters on the vertical axis. Similarly, FIG. 11B shows comparison of the moments in the edge direction. FIGS. 11A and 11B show the functions obtained in the case of obtaining the coefficients "a" and "b" by using the measurement data including the region A, and are compared with the ideal data in the calm state. The ideal function in the calm state is expressed as y=x. When the coefficients "a" and "b" are calculated by using the measurement data including the region A, y=0.9701x−31.88 is obtained. When the moment in the calm state and the moment calculated from the measurement data including the region A are compared with each other, many points exist in positions deviated from y=x. It shows that an error in the loads obtained by using the coefficients "a" and "b" calculated while including the measurement data of the region A is larger than that in the loads in the calm state.

Figure 12A:
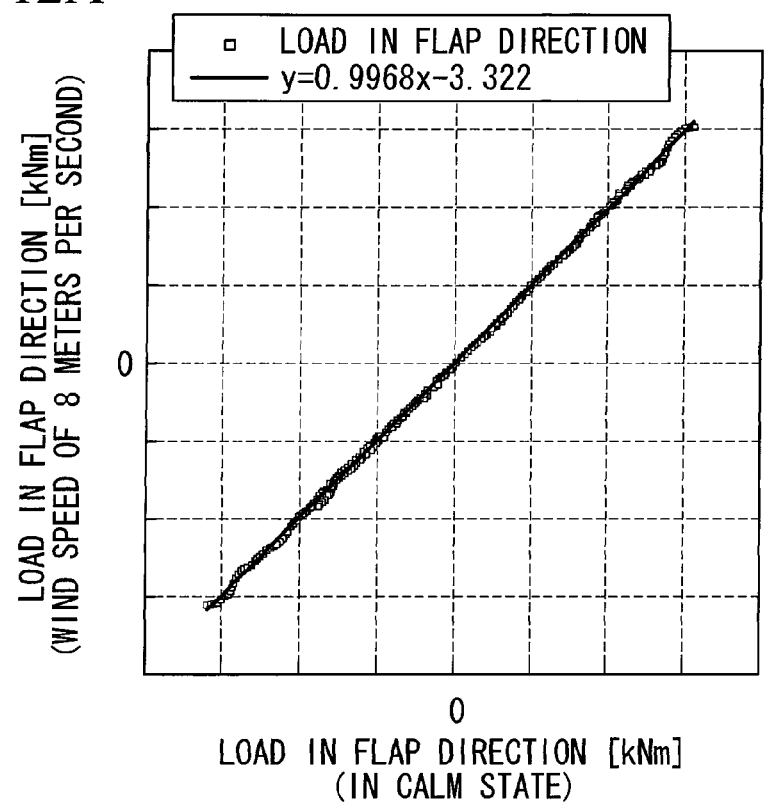
FIG. 12A Diagram showing an example of comparison between load (in the flap direction) and load in a calm state in the case where calibration is performed without including measurement data of a pitch angle in the range of the region A at a wind speed of 8 meters per second.
Figure 12B:
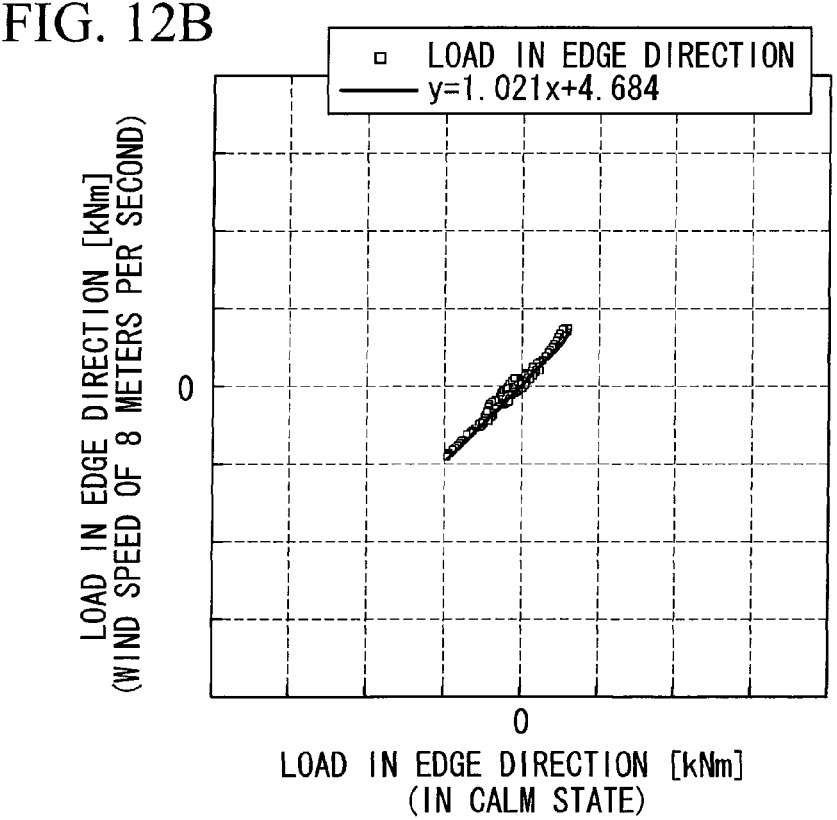
FIG. 12B Diagram showing an example of comparison between load (in the edge direction) and load in a calm state in the case where calibration is performed without including measurement data of a pitch angle in the range of the region A at a wind speed of 8 meters per second.

On the other hand, similarly to FIGS. 11A and 11B, FIGS. 12A and 12B show moments in the calm state on the horizontal axis and moments in the case of a wind speed of eight meters on the vertical axis, in a case of calculating the coefficients "a" and "b" by using measurement data excluding the measurement data obtained in the region A in FIG. 6. For example, as shown in FIG. 12A, in the case of calculating the coefficients "a" and "b" by using the measurement data without including the region A, y=0.9968x−3.322 is obtained. In the result of the loads thus obtained, as being obvious from the graph, the moments in the calm state and those in the case of the wind speed of eight meters almost coincide with each other. By calibrating the function with the coefficients "a" and "b" obtained without including the measurement data in the region A, the load can be more approximated to the load in the calm state.

In the case of obtaining measurement data by the sensors, it is sufficient to rotate the wind turbine blade 10 at least once from the azimuth angle of zero degree to 180 degree. One data file for calibration is generated by rotation of 180 degrees. However, the present invention is not limited to the number of rotation according to the azimuth angle. In the present embodiment, one data file for calibration is generated by rotation of 360 degrees.

More concretely, by moving the pitch angle from 109 degrees to 60 degrees or from 60 degrees to 109 degrees, the rotor starts idling. By moving the pitch angle from 109 degrees to 60 degrees, the rotor is rotated at least once, and thus one data file is obtained. Similarly, by moving the pitch angle from 60 degrees to 109 degrees, the rotor is rotated at least once and thus one data file is obtained.

In other words, in the present embodiment, in the range exclusive of the aerodynamic influence, at the time of moving the pitch angle to the fine side, one data file for calibration is obtained under the condition that the rotor rotates at least once. Similarly, at the time of moving the pitch angle to the feather side, one data file for calibration is obtained.

In the present embodiment, by performing the pitch angle operation as described above, ten data files for calibration are obtained.

Further, in the case where calibration data for ten times (that is, the coefficients "a" and "b") is calculated, reliability of the coefficients "a" and "b" is preferably verified by calculating the average value of the data.

X denotes data for calibration (18 pieces of measurement data in the calm state and 12 pieces of calibration data (data in the edge direction and the flap direction of each of the wind turbine blades 10), and N denotes the number of times of moving the pitch angle from 109 degrees to 60 degrees and to 109 degrees (one cycle). "m" denotes an average value. In this case, the maximum and minimum data is eliminated from 2N pieces of calibration data files, and an average value of 2(N−1) files is obtained. Whether the average value of each calibration values "a" and "b" satisfies the following range condition or not is verified. In the case where the average value satisfies a reference value, the average value of the calibration data is set as an on-site parameter.

[Mathematical Expression 3]

Average value $$m = \sum_{n=1}^{2(N-1)} \frac{X_n}{2(N-1)} \quad (8)$$

Average Value
Verification of Reference Value $$1.7 \times 10^9 < a < 2.7 \times 10^9 \quad (9)$$

$$-100 \text{ kNm} < b < 100 \text{ kNm} \quad (10)$$

As described above, measurement data is obtained by the sensors provided to the wind turbine blades 10 and, on the basis of the obtained data, distortions and loads of the wind turbine blades 10 are calculated. A function stored in the load calculating unit 20 is calibrated with coefficients of a new function obtained from the relation between the distortion and the load of the wind turbine blade 10 calculated on the basis of the measurement data. Since a new function is easily calculated from the measurement data, the coefficients for calibration can be easily determined.

Used at this time is measurement data of the sensor obtained in the pitch angle range of the wind turbine blade 10 in which the variation between the maximum and minimum aerodynamic torques is equal to or less than a predetermined value. Since measurement data in which the influence of the aerodynamic torque can be ignored is used, precision of the calibration can be improved.

By calculating a distortion of a sensor itself and offsetting it, precision of the calibration can be further improved. Further, measurement data may be obtained in the pitch angle range of the wind turbine blade 10 (for example, the range of the pitch angle from 60 degrees to 109 degrees) in which the variation between the maximum and minimum aerodynamic torques is equal to or less than a predetermined value. The measurement data is not limited particularly to the azimuth angle. Therefore, measurement data in a wide range can be used for calibration.

Since acquisition of measurement data, calculation of a load and a distortion, and verification of reliability of calibration data are performed by the load measuring apparatus 100, time required for the calibration work can be shortened, and the burden on the user can be reduced.

In the above-described embodiment, processing performed by hardware is assumed as the load measuring apparatus. However, the present invention does not have to be limited to such a configuration. For example, there may be employed a configuration for processing by software on the basis of output signals from the sensors. In this case, the load measuring apparatus includes a CPU, a main storage such as a RAM, and a computer-readable recording medium on which a program for realizing all or part of the processing is recorded. The CPU reads the program recorded on the recording medium and executes processing/computing of information, thereby realizing processing similar to that of the above-described load measuring apparatus.

The computer-readable recording medium is a magnetic disk, a magnetooptical disk, a CD-ROM, a DVD-ROM, a semiconductor memory, or the like. It is also possible to distribute this computer program to a computer via a communication line and execute it by the computer to which the program is distributed.

Modifications

In the load measuring apparatus 100 according to the present embodiment, the function is calibrated on the basis of measurement data of the sensor obtained in the pitch angle range of the wind turbine blade 10 in which the variation between the maximum and minimum aerodynamic torques is equal to or less than a predetermined value. However, the present invention is not limited to the above. For example, it is also possible to set the range of the rotational speed of the wind turbine blade 10 in place of the pitch angle range and calibrate the function on the basis of data of the sensor obtained in the range of the rotational speed of the wind turbine blade in which the variation between the maximum and minimum aerodynamic torques due to wind speeds is equal to or less than a predetermined value.

Although the number of the plurality of wind turbine blades 10 is three in the wind turbine generator 1 according to the present embodiment, the number of wind turbine blades 10 is not particularly limited.

In the load measuring apparatus 100 according to the present embodiment, the number of the sensors attached to one wind turbine blade 10 is six. However, the number of sensors is not particularly limited.

In the load measuring apparatus 100 according to the present embodiment, the table 31 is obtained by calculation by using the azimuth angle and the pitch angle. However, the present invention is not limited to the present embodiment. For example, a table may be provided in advance to the calibration unit 30.

Second Embodiment

Next, a second embodiment of the present invention will be described.

The difference in the load measuring apparatus of the present embodiment from the first embodiment is that data is obtained such that angle data of the azimuth angle and the pitch angle is limited to predetermined values and wind speeds are limited to a range in which negative aerodynamic torques are small. In the following, with respect to the load measuring apparatus according to the present embodiment, the points common to the first embodiment will not be described and different points will be mainly described.

When the wind speed is three meters or less, the sensor 7 obtains measurement data when the pitch angle is set to the minimum and maximum pitch angles at two points of a first azimuth angle and a second azimuth angle turned by 180 degrees from the first azimuth angle.

More concretely, the sensor obtains measurement data in the case where the wind speed is three meters or less, the azimuth angles of the wind turbine blade 10 are 90 degrees and 270 degrees, and the pitch angles at the respective azimuth angles are set to 21 degrees and 109 degrees.

In the case of measuring data of one wind turbine blade 10, the pitch angles of the other two wind turbine blades 10 are set to, for example, 85 degrees or the like so as to be an idle state.

By using the data measured at two points in positions of the azimuth angles different from each other by 180 degrees, as measurement data used for the function calculated by the parameter calculating unit 34, data of a wide range with respect to the horizontal axis can be obtained. Thus improved is precision in the case of calculating the coefficients "a" and "b" from small measurement data. Since the parameters can be calculated from small measurement data, time required for calibration can be shortened.

Although the embodiments of the present invention have been described above in detail with reference to the drawings, concrete configurations are not limited to these embodiments. Design changes and the like in the range not departing from the gist of the present invention are also included therein.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A load measuring apparatus applicable to a wind turbine in which a pitch angle of a wind turbine blade is variable, the apparatus comprising:
    a sensor for obtaining measurement data related to a distortion of the wind turbine blade;
    a load calculating means having a function expressing a relation between the distortion of the wind turbine blade and a load on the wind turbine blade, for obtaining the load on the wind turbine blade by applying to the function the distortion based on measurement data of the sensor; and
    a calibrating means for calibrating the function based on the measurement data of the sensor obtained in a pitch angle range and a rotational speed range of the wind turbine blade in which a variation between maximum and minimum aerodynamic torques due to wind speeds is equal to or less than a predetermined value.

2. The load measuring apparatus according to claim 1, wherein the calibrating means calibrates the function based on the measurement data of the sensor obtained in the pitch angle range and the rotational speed range of the wind turbine blade in which the aerodynamic torque is equal to or less than a predetermined value.

3. The load measuring apparatus according to claim 1, wherein the calibrating means includes:
    a table in which the load on the wind turbine blade in a calm state and a pitch angle and an azimuth angle of the wind turbine blade are associated with one another;
    a load obtaining means for obtaining from the table a load on the wind turbine blade corresponding to the pitch angle and the azimuth angle of the wind turbine blade when the measurement data is obtained by the sensor;
    a distortion calculating means for calculating a distortion of the wind turbine blade from the measurement data of the sensor; and
    a parameter calculating means for calibrating a parameter of the function based on the relation between the load on the wind turbine blade obtained by the load obtaining means and the distortion calculated by the distortion calculating means.

4. The load measuring apparatus according to claim 3, wherein the calibrating means obtains the measurement data of the sensor in the calm state based on the load on the wind turbine blade obtained by the load obtaining means and the measurement data of the sensor, and offset-calibrates the measurement data of the sensor by using the measurement data in the calm state.

5. The load measuring apparatus according to claim 1, wherein the sensor includes:
    a pair of first sensors provided in positions opposed to each other with the wind turbine blade sandwiched therebetween; and
    a pair of second sensors provided in positions opposed to each other with the wind turbine blade sandwiched therebetween, the positions different from those of the first sensors.

6. The load measuring apparatus according to claim 5, wherein the sensor includes:
    a pair of third sensors provided in positions opposed to each other with the wind turbine blade sandwiched therebetween, the positions different from those of the first and second sensors and parallel to either of the first and second sensors.

7. A load measuring method applicable to a wind turbine in which a pitch angle of a wind turbine blade is variable, the method comprising:

obtaining a distortion of the wind turbine blade, using measurement data obtained by a sensor;

providing a function expressing a relation between the distortion of the wind turbine blade and a load on the wind turbine blade, and obtaining the load on the wind turbine blade by applying to the function the distortion based on measurement data of the sensor; and calibrating the function based on the measurement data of the sensor obtained in a pitch angle range and a rotational speed range of the wind turbine blade in which a variation between maximum and minimum aerodynamic torques due to wind speeds is equal to or less than a predetermined value.

8. A load measuring method applicable to a wind turbine in which a pitch angle of a wind turbine blade is variable, the method comprising:

providing a function expressing a relation between a distortion of the wind turbine blade and a load on the wind turbine blade, and obtaining the load on the wind turbine blade by applying to the function a distortion based on measurement data obtained by a sensor; and calibrating the function based on respective measurement data of the sensor obtained when the pitch angle is set to minimum and maximum pitch angles in two points of a first azimuth angle and a second azimuth angle different from the first azimuth angle by 180 degrees in a case where a wind speed is equal to or less than three meters per second.

* * * * *